United States Patent [19]

Buchanan et al.

[11] 4,154,101
[45] May 15, 1979

[54] AIR VELOCITY GAUGE

[75] Inventors: Steven O. Buchanan, Michigan City; Robert W. Butts, Lakeville, both of Ind.

[73] Assignee: Dwyer Instruments, Inc., Ind.

[21] Appl. No.: 878,608

[22] Filed: Feb. 16, 1978

[51] Int. Cl.² ............................................... G01F 1/28
[52] U.S. Cl. ...................................... 73/228; 73/272 R
[58] Field of Search ....................... 73/228, 272 R, 273

[56] References Cited

U.S. PATENT DOCUMENTS

| 3,636,766 | 1/1972 | Austin | 73/228 |
|---|---|---|---|
| 3,796,097 | 3/1974 | Ruskin | 73/228 |
| 3,826,136 | 7/1974 | Chang | 73/228 |
| 3,955,415 | 5/1976 | Sharon | 73/228 |

*Primary Examiner*—Herbert Goldstein

[57] ABSTRACT

An air velocity gauge for direct measurement of low air flow or draft rates in the range of 20–400 feet per minute comprising a generally flat housing of quadrilateral shape defining a draft way therethrough and a set of opposed draft way inlet and outlet openings that are aligned with the plane of the housing that approximate the size and general shape of the way. A vane formed from a strip of Mylar polyester film is suspended pendulum fashion from the upper portion of the housing adjacent the draft way inlet and is creased longitudinally of same to rigidify the vane to act as such rather than as a flexible flap. The housing itself is in the form of an open centered center frame with open sides, to each side of which is applied a transparent side plate held in place by an adhesively backed opaque scale or scale plate that adheres to lands defined by the housing center frame for this purpose. The scale plates are formed with mirror image windows struck on the arc of movement of the vane that are calibrated to directly read air flow velocity in proportion to the vane deflection about its pivot axis. The housing end plates are formed with cooperating ports for housing a level bubble vial for leveling the gauge; the housing side plates are also formed to define fastener receiving sleeves for mounting the gauge in use.

15 Claims, 7 Drawing Figures

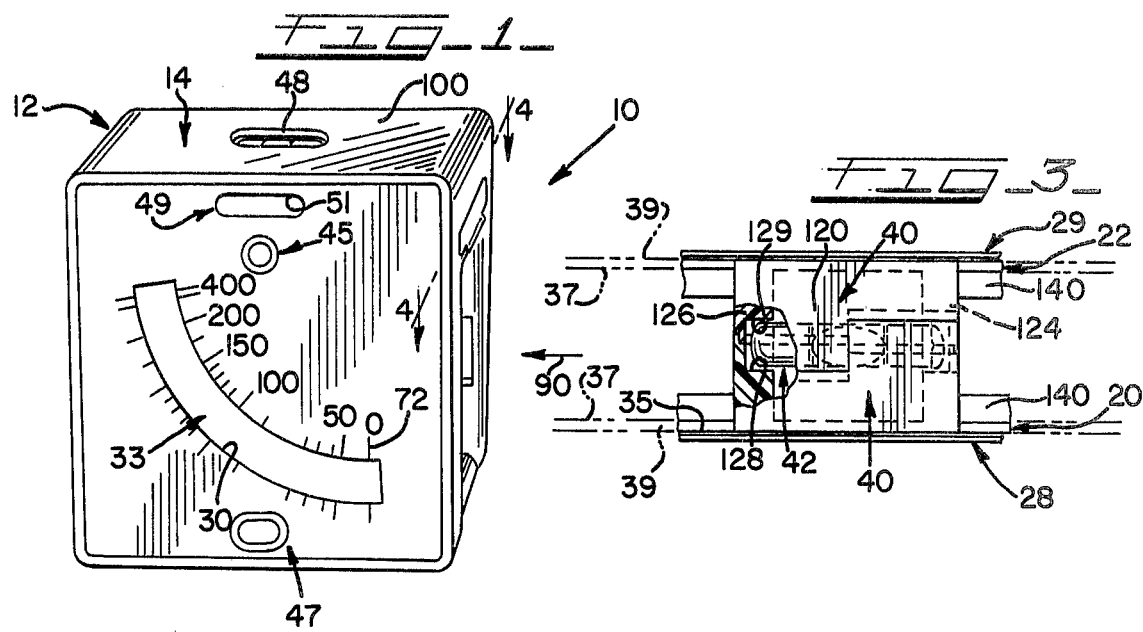
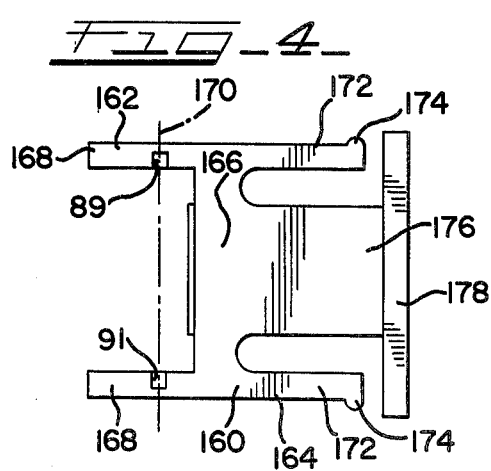
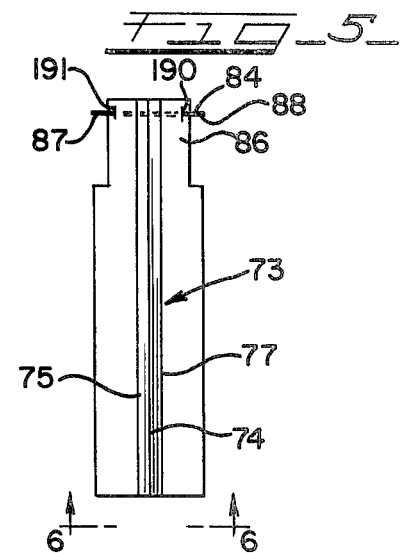
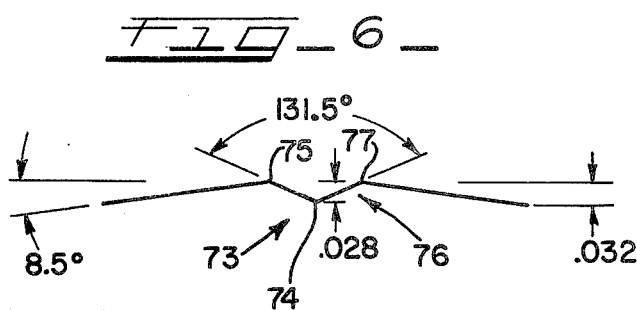
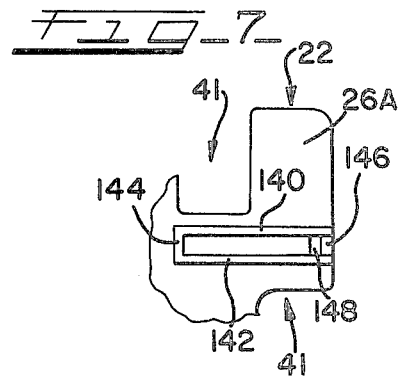

AIR VELOCITY GAUGE

This invention relates to an air velocity gauge, and more particularly, to an air velocity gauge for measuring low air flow rates, such as those in the 20–400 feet per minute range.

The Occupational Safety & Health Administration (OSHA) regulations and other sources of ventilation and safety standards now in general use have made it important to be able to accurately measure low air flow rates so as to be able to show compliance with standards that have been set.

As an example of the problems presented, OSHA regulations dealing with the operation of spray painting booths require that the minimum maintained air flow velocity or draft through the booth be in the 75–250 foot per minute range, depending on the design of the booth and other factors. Where the painting operation in the booth is electrostatic and without air guns, and no operator is present, the minimum maintained air flow velocity or draft through the booth may be in the 50–75 feet per minute range.

However, conventional air velocity measuring devices are expensive, and are not particularly suited for measuring air flow at the very low flow rates indicated, due to such factors as multiple and intricate moving parts, inertial loads to be overcome, and actuating power requirements.

One conventional air velocity measuring device is the so-called hot wire anemometer, which requires electrical power to operate and costs in the $300.00 to $500.00 range.

A less expensive mechanical device available is of the rotational vane type that involves a number of intricate moving parts and costs in the neighborhood of $150.00 or more.

However, the Applicants are not aware of the availability of air velocity gauges selling for under $50.00 that function reliably in the ultra low 20–400 foot per minute range.

A principal object of this invention is to provide a low cost velocity gauge of simplified and trouble free nature that reliably measures air velocity or draft movement in the low air flow 20–400 feet per minute rate range.

Another principal object of the invention is to provide a simplified but accurate air velocity gauge having only one moving part, and that relies only upon the impetus of the air movement itself to operate the vane, and thus has no external power requirements.

Another principal object of the invention is to provide an air velocity gauge arrangement in which the read out is provided by direct action of the air movement on a free swinging vane of ultra low inertial resistance, to provide an air velocity gauge that is formed from inexpensive plastic materials with metal parts as such minimized, and comprise an air velocity gauge arrangement that can be readily understood and used by those with minimal experience with air flow measurement devices.

Yet another principal object of the invention is to provide a pendulously mounted vane type gauge in which the vane is of special construction that is particularly suited for accurate air velocity measurement in the ultra low flow rate ranges indicated.

Still other objects of the invention are to provide an air velocity gauge arrangement in which the housing is free of mechanical fasteners, that is designed for easy fit-together assembly with minimal tool requirements, and employs a pendulously mounted vane formed from wear and handling resistant light weight plastic material of film dimension thickness that is especially arranged for precluding flexing of the vane, and to provide an air velocity gauge that is inexpensive and simple to manufacture and assemble and is accurate and has long life in use.

In accordance with the invention the air velocity gauge comprises a generally flat housing of convenient quadrilateral shape defining a draft way therethrough and a set of opposed draft way inlet and outlet openings that are aligned with the plane of the housing and that approximate the size and general configuration of the transverse cross-sectional configuration of the way. The gauge is especially characterized by a special arrangement comprising a vane formed from a strip of Mylar polyester film that is suspended pendulum fashion from the upper portion of the housing adjacent the housing draft way inlet, and that is creased or indented longitudinally of same to define rigidifying apexes extending the length of the vane, whereby the vane acts as a semi-rigid vane rather than a flexible flap in reacting to air flow through the gauge draft way.

The housing itself is in the form of a open centered center or central frame with open sides, to each side of which is applied a transparent side plate held in place by an adhesively backed opaque scale plate that adheres to lands defined by the housing center frame for this purpose. The scale plates are formed with mirror image windows struck on the arc of movement of the vane that are calibrated to directly read air flow velocity in proportion to deflection of the vane about its pivot axis due to the rate of air flow or draft through the gauge draft way. The gauge housing side plates are formed with integral cooperating parts for housing a level bubble vial for leveling the gauge, and in addition, the side plates are formed to define abutting fastener receiving sleeves for mounting the gauge in use.

The vane of the gauge is removably mounted in a removable bracket, and is arranged to be of adequate sensitivity for the ultra low air flow or draft rate requirements indicated, but yet be sufficiently tough or wear resistant to permit periodic cleaning, as when used in situations wherein ambient air conditions, such as those in a paint spray booth, require periodic cleaning of the vane to maintain its sensitivity.

Other objects, uses, and advantages will be obvious or become apparent from a consideration of the following detailed description and the application drawings in which like reference numerals indicate like parts throughout the several views.

In the drawings:

FIG. 1 is a diagrammatic frontal perspective view illustrating a preferred embodiment of the invention;

FIG. 3 is a fragmental top plan view of the device with the center frame omitted, illustrating the manner in which the two side plates of the housing assembly are formed to cooperate to receive and mount the level bubble vial of the device;

FIG. 4 is a top plan view of the vane mounting bracket that is diagrammatically illustrated in FIG. 2 (where it is shown displaced from its vane mounting position within the housing center frame);

FIG. 5 is a plan view of the special vane employed in accordance with the invention;

FIG. 6 is an end view of the vane shown in FIG. 5, taken substantially along line 6—6 of FIG. 5 and on an enlarged scale; and FIG. 7 is a fragmental elevational view of a portion of one of the housing side plates illustrating the vane bracket slideway that is defined by the housing side plates.

Figure 2:
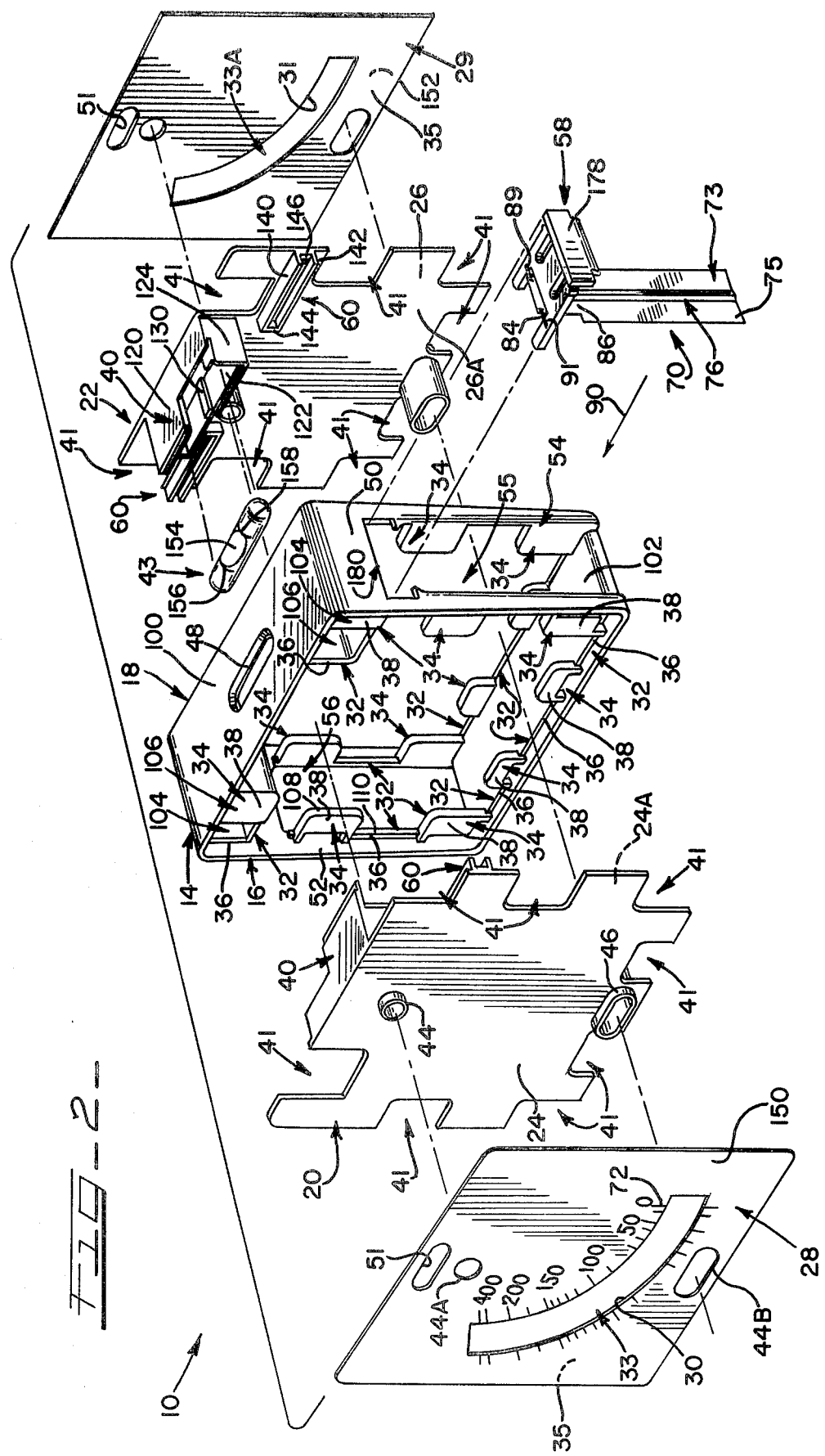
FIG. 2 is an exploded perspective view diagrammatically illustrating the basic components of the device and their manner of assembly.

However, it is to be distinctly understood that the specific drawing illustrations provided are supplied primarily to comply with the requirements of the Patent Laws, and that the invention is susceptible of other embodiments which will be obvious to those skilled in the art, and which are intended to be covered by the appended claims.

GENERAL DESCRIPTION

Reference numeral 10 of FIGS. 1 and 2 generally indicate a preferred embodiment of the invention which comprises a housing 12 formed by a central open centered frame 14 which is open at either side 16 and 18 of same for application thereto of side plates 20 and 22 that are preferably formed from a suitable transparent material.

The outwardly facing surfaces 24 and 26 of the respective side plates 20 and 22 each have applied to same the respective gauge or scale plates 28 and 29. Plates 28 and 29 are formed from a suitable opaque material (aluminum in the illustrated embodiment), and are formed to define the respective arcuate slots 30 and 31 in mirror image relation to form the respective window openings 33 and 33A that provide for visibility through the respective side plates 20 and 22 to the other side of the housing 10 for purposes of reading the gauge. The respective gauge plates 28 and 29 on the inwardly facing sides of same each bear an adhesive backing 35 coextensive therewith for adherence to cooperating parts of both the respective side plates 20 and 22 and the housing frame 14 to secure the components of the housing 12 together without employing mechanical fastening devices.

for this purpose, the central frame 14 at both sides 16 and 18 of same is formed with a first set of lug or abutment structures 32 spaced thereabout each defining surfacing 36 against which the inwardly facing sides 24A and 26A of the respective side plates 20 and 22 seat at either side of the frame 14. The frame 14 is also formed with a second set of lug or abutment structures indicated at 34 each defining an abutment surfacing 38 that is to be engaged by the adhesive coating 35 for adhering the respective scale plates 28 and 29 to the frame 14.

The surfacings 36 of the respective lug structures 32 at either side of frame 14 are in coplanar relation with the surfacings 36 being coplanar with the respective planes 37 at either side of frame 14 (see FIG. 3).

The surfacings 38 on either side of the frame 14, on the other hand, are coplanar with the respective planes 39, at either side 16 and 18 of the frame 14, disposed outwardly of the respective planes 37, and are to be coplanar with the outer surfaces 24 and 26 of the respective side plates 20 and 22 in the assembled relation of the frame. The planes 37 and 39 are indicated in broken lines in FIG. 3.

For this purpose, the respective side plates 20 and 22 are notched as indicated at 41 in FIGS. 2 and 7 about their respective sides or marginal edgings to receive the lug or abutment structures 34 that define the respective abutment surfacings 38 in the assembled relation of the housing. The notches 41 are of varient configurations complimenting the outline of the abutment or lug structures 34 they are to receive.

It will thus be seen that in accordance with the present invention, the side plates 20 and 22 are applied within the respective sides 16 and 18 of the housing center frame 14 to have their respective surfaces 24A and 26A seat against the respective surfacings 36, which thus act as locating stops for mounting the side plates 20 and 22 in place within the frame 14. The surfacings 36 are thus set back within the frame 14 approximately the thickness of the respective side plates 20 and 22 so that the adhesive coatings 35 of the respective gauge plates 28 and 29 will seat against both the side plate surfaces 24 and 26 (of the respective side plates 20 and 22) as well as the abutment surfacings 38, when the respective gauge plates 28 and 29 are applied within the sides 16 and 18 of housing 14.

Further in accordance with the invention, the side plates 20 and 22 are each formed with the respective receptacle segments 40 that are of complemental segment form to define in the assembled relation of the housing 12 the chamber 42 in which a familiar form of level bubble capsule or vial 43 is mounted for leveling the gauge 10.

The respective side plates 20 and 22 also each define an upper sleeve segment 44 and a lower sleeve segment 46. The respective sleeve segments 44 and 46 are proportioned such that when the side plates 20 and 22 are in assembled relation in the housing 12, the sleeve segments 44 and the sleeve segments 46 are at or near substantial abutting relation without effecting the firm seating of the side plates 20 and 22 against the surfacings 36, and these aligned sleeve segments define the respective sleeve structures 45 and 47 (see FIG. 1) through which suitable attachment screws may be applied for securing the gauge in operating position. The sleeve segments 46 are of oblong configuration in transverse cross section corresponding to the horizontal axis of same to permit the gauge to be leveled by observing the bubble of the level vial through suitable window 48 formed in the center frame 14 or the windows 49 defined by the openings 51 formed in the respective gauge plates 28 and 29.

The gauge plates 28 and 29 are each apertured as indicated at 44A and 44B, respectively, to receive the outwardly protruding portions of sleeve segments 44 and 46 at either side of the housing section 14.

As indicated in FIG. 2, the center frame 14 defines opposing end walls 50 and 52 which are respectively formed to define the respective window openings 54 and 56 that form the inlet and outlet openings to the housing draft way 55 through which the air flow to be measured passes through the gauge. The gauge inlet 54 and outlet 56 each have a size and configuration roughly approximating the draft way 55 in vertical section so that the air flow through the gauge passes therethrough in a substantially unimpeded manner.

Applied above the window opening 54 is a slide in type mounting bracket 58 that mounts a novel vane 70 in its operating position within the guage 10. It is a feature of the invention that the side plates 20 and 22 are formed on their respective side surfaces 24A and 26A to define the respective slide ways 60 that are shaped to slidably receive and accurately position the bracket 58 and its vane 70 so that the vane 70 will be positioned vertically above and in alignment with the datum zero marking 72 of the respective gauge plates 28 and 29 when in its at rest position.

As indicated, the vane 70 is of special significance. In accordance with a preferred embodiment of the invention, it is formed from a polyester stripping having a thickness of approximately one mil (0.001 inch), and thus the stripping is of film thickness dimensions. In a highly successful embodiment the stripping is formed from Mylar polyester film having a thickness of one mil. Mylar is a trademark of E. I. Du Pont de Nemours & Co. for its polyester plastic film. Vane 70 is also proportioned widthwise and lengthwise to effectively partition off the sides of the draft way 55 that are on either side of same.

The vane 70, further in accordance with the invention, is imperforate below its pivotal mounting, and is formed with indentation means 73 extending along its longitudinal axis for sufficiently rigidifying the vane 70 so that when acting to measure air flow through the gauge 10, it will remain in a substantially planar or rectilinear configuration longitudinally of same, rather than flex laterally thereof in the manner of a freely flexing ribbon. In the form shown, the indentation means 73 comprises a center apex forming crease 74 and a pair of apex forming creases 75 and 77 equally spaced from, and on either side of the center crease 74, with the creases 74, 75 and 77 having approximately the angulations indicated in FIG. 6. The indentation means 73 thus defines a center ridge structure 76 along the mid portion of the vane 70 that extends in alignment with its longitudinal axis for maintaining the vane in a rectilinear substantially planar configuration while acting as a measuring vane in the gauge.

The vane 70 is journalled on the mounting bracket 58 by having a journalling pin 84 applied to the upper end 86 of the vane 70. It is a feature of the invention that the journalling pin 84 be of as small a diameter as reasonably possible to minimize the adverse effect of static friction, with the pin being 0.015 inch in a commercial embodiment. The pin at its outwardly projecting end portions 87 and 88 rests in the respective journalling slots 89 and 91 (see FIGS. 2 and 4) of the bracket 58 that are vertically disposed when the gauge 10 is mounted in its operating position. The vane 70 is preferably oriented with respect to its bracket 58 within the housing 12 so that the ridge structure 76 faces in the direction of air movement into the housing 12, as indicated by the arrows 90 of FIGS. 1 and 2.

The vane 70 is thus characterized by being in the form of a light weight but tough, wear resistant material of film thickness dimensions, in elongate strip form, in which the film stripping involved in creased or crimped longitudinally thereof to define the indentation means 73 that holds the vane 70 against flexure laterally of its plane. While the vane 70 is of flat angulation configuration in transverse section, it is substantially planar within the rather thin transverse dimension range indicated in FIG. 6.

The guage 10 is employed by mounting same in the air flow to be measured, with the instrument draft way 55 aligned with the direction of air flow so that the air flow enters inlet opening 54 and leaves outlet opening 56. This may be done by applying suitable fastening devices to the sleeve structures 45 and 47, with the instrument being leveled by observance of the level bubble vial 43 to align the vane 70 with the zero datum marking 72 of the gauge plates 28 and 29 for the condition of zero air flow through the gauge. When the air movement to be measured is generated by operation of the ventilating equipment or the like that is involved, the resulting air movement or draft through the gauge 10, and specifically through its draft way 55, impinges on the suspended vane 70, which is thus deflected to the left of the showing of FIGS. 1 and 2, in proportion to the flow rate involved, about its pivotal mounting, to read directly on the instrument scale defined by the gauge plates 28 and 29 the velocity of the air flow in question. The vane, of course, is of sufficient length so that its pendant end 75 extends across, and thus is visible through, the windows 33 and 35 of the instrument 10.

SPECIFIC DESCRIPTION

The frame 14 and bracket 58 may be formed from a suitable opaque plastic material, such as white ABS.

As indicated in FIGS. 1 and 2, the frame 14 is of generally quadrilateral configuration and preferably is of one piece construction including top wall 100 and bottom wall 102 in addition to the end walls 50 and 52. The window opening 48 is appropriately centered with the location that the level bubble vial receiving chamber 42 is to have in the assembled relation of the housing 12.

The lug or abutment structures 32 and 34 may be of any convenient configuration and location, the important thing being that they define the surfacings 36 and 38 that are respectively oriented in coplanar planes in the manner indicated such that the surfacings 36 are coplanar in plane 37 while the surfacings 38 are coplanar in plane 39 (see FIG. 3). It is also desirable that the surfacings 36 and 38 be in more or less alternate relation about the respective sides 16 and 18 of frame 14. In the form shown, at the upper corners of the frame 14, the surfacings 36 and 38 are defined by the oppositely oriented cells 104 and 106 that are closed at one side of the frame 14 to define surfacings 38, and are open at the other side of same to define surfacings 36. Thus, the cell 104 at one corner of the frame 14 opens at its side 16 while the cell 104 at the other corner of the frame opens at its side 18, and the cells 106 are similarly arranged. The remaining surfacings 36 and 38 are formed by the lugs 108 and ribs 110 that have been diagrammatically illustrated in FIG. 2. This specific arrangement, however, is a manner of choice and design, and the designer may use any abutment forming configurations he considers appropriate consistent with the objectives of the invention and an appropriate manner of making frame 14, which preferably is by a suitable injection molding procedure.

The side plates 20 and 22 are preferably each of one piece construction formed by employing a suitable injection molding procedure and arranged so that they are interchangeable. Thus, the plates 20 and 22 are each formed with a set of slide ways 60 on either side of same (on the respective surfaces 24A and 26A), as indicated for side plate 22 in FIG. 2. The side plates 20 and 22 are preferably formed from plexiglas or a suitable high impact acrylic plastic material, but are totally or substantially transparent for good visual viewing of the vane 70 through the windows 33 and 33A.

The vial receiving receptacle segments 40 each comprise an upper wall segment 120, a lower wall segment 122 (see FIG. 2), and side wall segments 124 and 126. The wall segments 124 and 126 are recessed as at 128 and 129 to receive the ends of the vial 43 in substantial abutting relation thereto. The lower wall 122 is formed with a central ridge 130 which engages under the back of the normally arched vial 43 for orienting purposes.

In applying the vial 43 to the guage, after one side plate 20 or 22 has been mounted in its operative position within the frame 14, the frame is oriented to dispose the inside surfacing 24A or 26A of the side plate in question upwardly, and the vial 43 is placed in its operative position within the then upwardly facing receptacle section 40 defined by the side plate in question. The vial 43 may then be secured in place by applying a drop or two of the adhesive at either end of same, after which the second side plate is secured to the frame in the idndicated manner to mount the vial in its operative position.

As indicated, the sleeve sections 44 and 46 are proportioned so that when the side plates are assembled to frame 14, the aligned sections 44 and 46 of each frame are at or near substantial abutting relation, while leaving the side plates 20 and 22 to seat firmly against frame surfacings 36, whereby the correct spacing between the slideways 60 is provided to slidably accommodate the vane bracket 58.

For each side plate 20 and 22, the slide ways 60 comprise a pair of upstanding opposed flanges 140 and 142 integral with an upstanding end wall 144, with the slide way being open as at 146 to receive bracket 58. The slide ways 60 are each formed to define adjacent the open end 146 thereof an indentation or socket 148 for both keying the bracket 58 to the frame 14 in its mounted position, and properly locating the vane 70 with respect to the datum zero marking 72 of the gauge plates 28 and 29.

The gauge plates 28 and 29 are suitably formed from aluminum plate of a suitable gauge. The slots 30 and 31 are of mirror image relation and the outer surfaces 150 and 152 of the respective plates 28 and 29 are formed to have the scale indicia indicated for plate 28 in FIGS. 1 and 2. The slots 30 and 31 are thus struck on an arc that is coaxial with the axis of pivotal movement of the vane 70. The gauge plates 28 and 29 are suitably formed with the windows 44A and 44B to receive the projecting ends of the respective sleeve segments 44 and 46, and to define the respective windows 51 that expose for viewing from the sides of frame 14 the level vial 43, and specifically its bubble 154 in its positioning between the usual level locating lines 156 and 158 that are indicated in the drawings.

The vane mounting bracket 58 is more specifically illustrated in FIG. 4 wherein it will be seen that the bracket 58 comprises the frame 160 of generally H shaped configuration defining elongate frame members 162 and 164 that are connected by cross frame portion 166. The frame members 162 and 164 at their like ends 168 are each suitably shaped to define the respective mounting slots 89 and 91 that pivotally mount the vane pivot pin 84. The vane pin 84 rests within the slots 89 and 91 to pivot same about pivot axis 170.

The bracket frame members 162 and 164 at their like ends 172 are each formed to define the respective protuberances 174 that are round in configuration for snap fitting into the respective recesses 148 formed in the respective slide ways 60.

The bracket 58 is formed with tab portion 176 extending from cross frame portion 166 and bearing handle portion 178 that is formed to fit flush within the slide way opening 180 defined by the housing frame 14 end wall 50 when the bracket 58 is received in its indicated operative position within the frame 14. The housing 12 and bracket 58 are arranged so that when the gauge is mounted in its "level" position, as indicated by vial bubble 154, and the vane bracket protuberances 174 are seated in slidway sockets 148, the vane pivot axis 170, the vane 70 and the zero datum markings 72 are coplanar in a vertical plane (assuming zero fluid flow through draft way 55, which is the at rest position of vane 70).

Referring now more specifically to the vane 70, a fundamental aspect of the invention is that the vane 70 must be of sufficiently light weight, low mass and inertia characteristics to be fully responsive to air velocities on the low order indicated, and yet be sufficiently tough to resist normal handling for cleaning purposes. It is also essential for reading accuracy purposes that the vane have sufficient stiffness or rigidity to act as an elongate rectilinear member, rather than flex in the familiar flap like manner under the air movements through the gauge.

The Mylar polyester film material having a thickness of 1 mil was finally hit upon as providing the light weight, low insertia, and toughness characteristics desired, but the polyester material in question having that thickness is highly flexible. The Applicants in their experimental work with reference to the vane 70 hit upon the utilization of the indentation of the vane along its longitudinal center to provide the stiffness or rigidity required.

The showing of FIG. 6 illustrates the indentation arrangement that is preferred including the angulations employed in a successful commercial embodiment of the invention. As a matter of practice, the angulation of the apexes 74, 75 and 77 may lie in the range of from approximately 120 degrees to approximately 140 degrees and provide the vane with the requisite rigidity along its mid portion that will resist flexing of the vane laterally thereof.

As indicated in FIG. 6, the vane 70 contemplates that the strip 73 will be slightly bowed along the length thereof in the direction of the apex 74, within a plane measuring 0.032 inch in thickness. It is preferred that the vane 70 be mounted within the gauge to dispose the vane 70 such that the apex 74 faces in the direction of air movement toward the vane, as this presents the generally concave side of the vane for engagement by the air flow to be measured. Vane 70 as so oriented seems to have maximized stiffness characteristics. However, the vane will provide satisfactory results if positioned so that the apex 74 faces in the opposite direction.

As indicated, the pivot pin 84 for the vane should be of minimal diameter to minimize stick friction problems. In the form shown, the pin is applied to the vane by slitting the vane where indicated at 190 and 191 and passing the pin through such slits in the manner indicated in FIG. 5, after which the pin is bonded to the vane by applying a drop of a suitable adhesive to one or both of the slits 190 and 191. Vane 70 is proportioned widthwise and lengthwise to substantially partition off draft way 55 in its at rest position for maximum sensitivity when air movement through draft way 55 occurs. In the form shown, the upper end 86 of the vane 70 is of reduced width to clear the inner ends of the slide ways 60 under maximized air velocity reading conditions.

It will therefore be seen that the invention provides an air velocity gauge of simplified and inexpensive construction in which the frame is composed of few and simple parts that are secured together without requiring mechanical fastening devices. The only moving part in the device is the vane that is suspended pendulum fashion for pivoting movement about an axis that extends crosswise of the gauge housing and transversely of the direction of movement of the air through the gauge.

The vane itself is of special significance in being arranged to be sufficiently light weight and low insertia so as to be responsive to air movements of the low order as indicated, while providing the toughness to resist handling and the rigidity required to obtain accurate read out of the gauge.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

We claim:

1. An air velocity gauge comprising:
    a housing having wall portions defining a planar draft way extending therethrough and a draft inlet thereto and a draft outlet therefrom that are aligned with the plane of and approximate the size of said way,
    an elongate vane suspended pendulum fashion from the upper portion of said housing adjacent to said inlet and disposed transversely of said draft way plane,
    said vane being pivotally mounted adjacent its upper end for free swinging movement between an at rest vertically disposed position for zero air flow through said way to an inclined position angled in the direction of air flow through said way on air flow being induced through said way,
    said vane being proportioned to substantially partition off said way when said vane is in its at rest position,
    said vane comprising a length of stripping of film thickness dimensions having indentation means extending longitudinally thereof for holding same against flexture.

2. The air velocity gauge set forth in claim 1 wherein said indentation means comprises:
    a rectilinear and uninterrupted apex extending along the mid portion of said vane.

3. The air velocity gauge set forth in claim 2 wherein:
    said apex is directed in the direction of air flow through said way when said vane is in its said at rest position.

4. The air velocity gauge set forth in claim 3 wherein said indentation means further comprises:
    a pair of rectilinear and uninterrupted apexes disposed on either side of the first mentioned apex,
    said apexes of said pair being directed oppositely of said first mentioned apex,
    said apexes being in crease form and shaping said vane to be concavely bowed on the side of same facing the direction of air flow through said way.

5. The air velocity gauge set forth in claim 2 wherein:
    said apex defines an angle lying in the range of from approximately 120 degrees to approximately 140 degrees.

6. The air velocity gauge set forth in claim 1 wherein:
    said vane is polyester film having a thickness on the order of one mil.

7. An air velocity gauge comprising:
    a flat housing having wall portions defining a draft way coplanar with the housing extending therethrough and a draft inlet thereto and a draft outlet therefrom that are in opposed relation in the plane of said housing and that approximate the size and configuration of said way,
    an elongate vane disposed transversely of said way and pivoted within the housing pendulum fashion adjacent one end of said vane and adjacent to said inlet for free swinging pivotal movement about an axis extending transversely of the plane of said housing disposed adjacent the upper portion of said way,
    said vane being proportioned transversely of said way and lengthwise of said vane to, when said vane is disposed in its at rest vertically disposed position, effectively partition said way into upstream and downstream portions on either side of said vane.
    said vane comprising a length of polyester of film thickness dimensions having indentation means extending longitudinally thereof for holding said vane length against flexture,
    with said indentation means being in crease form.

8. The air velocity gauge set forth in claim 7 wherein said indentation means comprises:
    a first rectilinear and uninterrupted apex formed in said vane length and extending along the longitudinal centerline thereof,
    and a pair of second rectilinear and uninterrupted apexes formed in said vane length on either side of and spaced substantially equally from and in parallelism with said first apex,
    said second apexes being directed oppositely of said first apex.

9. The air velocity gauge set forth in claim 8 wherein:
    said apexes define relatively flat angles lying in the range of from about 120 degrees to about 140 degrees.

10. In an air velocity gauge including a flat housing of generally quadrilateral configuration defining a draft way therethrough between opposite sides of the housing that is coplanar with the housing and having a vane mounted in the housing extending across and transversely of the draft way for movement under the impetus of air flow through the draft way and scale indicia formed on the housing for reading of air velocity flow through the draft way, the improvement said housing comprises:
    an open centered center frame of quadrilateral configuration having two of its opposed ends ported to form the inlet and outlet ends of the draft way, with said frame being open at either side of said frame,
    said frame at both said sides thereof defining dual level abutment surfacing comprising a first series of lands spaced about said frame and coplanar with a first plane paralleling the housing, and a second series of lands spaced about said frame and coplanar with a second plane paralleling the housing and spaced outwardly of said first plane,
    a pair of side plates positioned one at either side of said frame,
    with the respective side plates abutting said first series of lands and being interrupted to receive the lands of said second series of lands,
    a pair of scale plates positioned one at either side of said frame adjacent and outwardly of the respective side plates,
    said scale plates each having their inwardly facing sides adhesively coated and adhering to said second series of lands to secure the side plate and scale plate at either side of said frame to said frame, said vane being pivotally mounted adjacent one end thereof in said frame adjacent the draft way inlet and hanging in a operative position pendulum style across said draft way for free swinging movement about an axis disposed crosswise of the housing under the impetus of air flow through said draft way, said scale plates defining coinciding mirror image arcuate windows struck on a radius centered on said axis and having a length no greater than the length of said vane, with said windows being calibrated to read air flow rate through said way in proportion to the deflection of said vane under the impetus of said air flow through the way, said side plates being transparent at the portions of same underlying the respective scale plate windows.

11. The improvement set forth in claim 10 including:

means for removably mounting said vane in its said operative position, said vane mounting means comprising:

a removable bracket, slidably mounted between said side plates, in which said vane is pivoted, said bracket and said side plates including snap fit means for setting said bracket within the housing to dispose said vane in its said operative position.

12. The improvement set forth in claim 10 wherein:

said side plates include aligned sleeves above and below said way for receiving fastener means for mounting the housing on a support.

13. The improvement set forth in claim 12 wherein:

said sleeves below said way are of elliptical configuration for adjusting the housing to position said vane at the zero datum calibration of said windows.

14. The improvement set forth in claim 10 wherein:

said side plates above said way are formed to defined a level bubble vial receiving chamber, and a level bubble vial mounted in said chamber, said frame being apertured for reading of said vial.

15. The improvement set forth in claim 10 wherein said vane comprises:

a length of polyester of film dimensions having indentation means extending longitudinally thereof for holding said vane length against flexture.

* * * * *